(12) United States Patent
Thorn (10) Patent No.: US 8,747,029 B2
(45) Date of Patent: Jun. 10, 2014

(54) LOW PRESSURE CONTINUOUS DENSE PHASE CONVEY SYSTEM USING A NON-CRITICAL AIR CONTROL SYSTEM

(75) Inventor: Jonathan Thorn, Kansas City, MO (US)

(73) Assignee: MAC Equipment, Inc., Kansas City, MO (US)

( * ) Notice: Subject to any disclaimer, the term of this patent is extended or adjusted under 35 U.S.C. 154(b) by 518 days.

(21) Appl. No.: 13/099,123

(22) Filed: May 2, 2011

(65) Prior Publication Data

US 2011/0268510 A1   Nov. 3, 2011

Related U.S. Application Data

(60) Provisional application No. 61/330,677, filed on May 3, 2010.

(51) Int. Cl.
   *B65G 53/00*   (2006.01)

(52) U.S. Cl.
   USPC .............. 406/197; 406/30; 406/127; 406/144

(58) Field of Classification Search
   USPC ................................. 406/30, 127, 144, 197
   See application file for complete search history.

(56) References Cited

U.S. PATENT DOCUMENTS

| | | | |
|---|---|---|---|
| 3,875,955 A * | 4/1975 | Gallatin et al. | 137/14 |
| 4,019,783 A * | 4/1977 | Kayser | 406/144 |
| 4,122,611 A * | 10/1978 | Marchal et al. | 34/73 |
| 4,284,032 A * | 8/1981 | Moos et al. | 118/684 |
| 4,362,442 A * | 12/1982 | Bentzen-Bilkvist et al. | 406/109 |
| 4,379,663 A * | 4/1983 | Allison | 406/23 |
| 4,506,834 A * | 3/1985 | Ek | 241/1 |
| 4,521,139 A * | 6/1985 | Kretschmer et al. | 406/19 |
| 4,722,363 A * | 2/1988 | Allyn | 137/601.18 |
| 4,758,117 A * | 7/1988 | Maki et al. | 406/14 |
| 4,875,810 A * | 10/1989 | Chiba et al. | 406/14 |
| 5,350,257 A * | 9/1994 | Newbolt et al. | 406/75 |

(Continued)

FOREIGN PATENT DOCUMENTS

| JP | 09-278183 A | 10/1997 |
|---|---|---|
| JP | 11-130257 A | 5/1999 |

(Continued)

OTHER PUBLICATIONS

Notification of Transmittal of the International Search Report and the Written Opinion of the International Searching Authority, or the Declaration dated Jan. 6, 2012; International Application No. PCT/US2011/034983; International Filing Dated: May 3, 2011; Applicant: Mac Equipment, Inc.

*Primary Examiner* — Joseph Dillon, Jr.
(74) *Attorney, Agent, or Firm* — Hovey Williams LLP (57) ABSTRACT

An air control system for a low pressure continuous dense phase convey system employs a non-critical air flow control system that allows for a supply pressure to be only incrementally larger than a convey pressure. The convey system has an inlet for introduction of pressurized air into the system and an airlock associated with a feedpoint for introduction of particulate into the system. A first pressure sensor is positioned immediately downstream of an air source to measure the supply pressure, and a second pressure transducer is positioned proximate an airlock to measure the convey pressure. The non-critical air flow control system is dependent on the supply and convey pressures and a position of a control valve, such as a sonic nozzle. The difference between the convey pressure and the supply pressure is less than 10% of the supply pressure.

6 Claims, 4 Drawing Sheets

(56) References Cited

U.S. PATENT DOCUMENTS

| | | | |
|---|---|---|---|
| 5,603,751 A * | 2/1997 | Ackerson | 95/268 |
| 5,813,801 A * | 9/1998 | Newbolt et al. | 406/14 |
| 6,062,774 A * | 5/2000 | Fourcroy et al. | 406/197 |
| 6,481,935 B2 * | 11/2002 | Dibble et al. | 406/83 |
| 7,101,120 B2 * | 9/2006 | Jurkovich | 406/12 |
| 7,537,375 B2 * | 5/2009 | Hoff et al. | 366/141 |
| 2011/0232547 A1 * | 9/2011 | Schmit et al. | 110/263 |
| 2014/0000720 A1 * | 1/2014 | Mortzheim et al. | 137/1 |

FOREIGN PATENT DOCUMENTS

| | | |
|---|---|---|
| JP | 2000-015203 A | 1/2000 |
| KR | 10-2005-0091186 A | 9/2005 |
| KR | 10-2007-0119778 A | 12/2007 |

* cited by examiner

LOW PRESSURE CONTINUOUS DENSE PHASE CONVEY SYSTEM USING A NON-CRITICAL AIR CONTROL SYSTEM

RELATED APPLICATION

The present non-provisional patent application claims priority benefit, with regard to all common subject matter, of U.S. Provisional Patent Application No. 61/330,677, filed May 3, 2010, and entitled "Low Pressure Continuous Dense Phase Convey System Using a Non-Critical Air Control System." The above-referenced provisional patent application is hereby incorporated by reference in its entirety.

BACKGROUND

1. Field

Embodiments of the present invention relate to continuous dense phase pneumatic convey systems. More particularly, embodiments of the present invention relate to a low pressure continuous dense phase convey system that employs a non-critical air control system so as to achieve relatively low energy consumption while maintaining minimal particulate degradation.

2. Related Art

A low pressure continuous dense phase ("LPCDP" or "CDP") convey system uses a low pressure air supply to drive a low effective air velocity (approximately 400-1800 feet per minute ("FPM")) pneumatic convey system. The CDP convey system employs an airlock to feed material into a convey line at a feedpoint of the convey system. To allow the CDP system to operate effectively, an air control system is employed for controlling a rate of air flow through the convey system as the conveying pressure repeatedly increases and decreases during conveying operation. In general, a desired rate of air flow through the convey system is calculated by adding a predicted amount of leakage air to the desired amount of conveying air that passes through the convey line.

To obtain the desired amount of conveying air through the convey line, prior art convey systems employ a critical air flow control system. In such a system, the air pressure produced by an air source, such as a blower, is significantly greater than the air pressure needed to convey the material. In one prior art system and method, a blower for producing an air flow is positioned upstream of the feedpoint. Air produced by the blower is supplied across an infinite position sonic nozzle ("IPSN" or the "nozzle"). The nozzle acts as a control valve for controlling or otherwise metering the amount of supply pressure P1 is nodpoint of the convey system.

In a critical air flow control system, the air supplied from the blower, i.e., the supply pressure, P1, and to the control valve, i.e., the nozzle, is held constant. The air flow exiting the control valve can be modeled, such that if the supply pressure, P1, communicated to the control valve is held constant, then the air flow across the control valve is predictable using critical flow calculations. Thus, the air flow exiting the control valve is also predictable by valve position only and is unaffected by a downstream convey pressure, P2. The relationship of P1 to P2 in the critical air flow regime is the following:

$$(P1 + P_a) \geq \frac{(P2 + P_a)}{\text{Efficiency}}$$

where $P_a$ is atmospheric pressure, and "Efficiency" is a percentage value representing the efficiency of the control valve, which is known. The Efficiency of a valve is usually referred to as the value to which P2 can rise in a critical air flow system before the rate of air flow is decreased as a result. For example, in an inefficient valve, P2 can only rise to 50%-60% of P1, whereas in highly efficient valve, P2 can rise to approximately 80%-85% of P1.

To insure that the supply pressure, P1, to the control valve is constant, a mechanical relief valve is positioned downstream of the blower and upstream of the control valve. The mechanical relief valve is used to vent any excess air to atmosphere that is generated by the blower and that is not used by the control valve. Thus, the mechanical relief valve assists in maintaining the constant supply pressure, P1, to an inlet of the control valve.

In other prior art systems, an IPSN or control valve is not employed between the blower and the feedpoint of the convey system. Instead, once the air is discharged from the blower, it is provided to the feedpoint of the convey system with no further modulation or control. Modulation is instead performed on the blower inlet, where throttling changes the blower performance. The blower operates at a constant speed and is throttled as necessary. Because the convey system pressure is constantly changing, the blower pressure is constantly throttled, resulting in inefficient and unnecessary air production by the blower. During conveying operation, the blower fluctuates between being throttled a small amount or not at all to being throttled a large amount.

In both of the above-described prior art systems, the differential pressure created is significantly greater than the air supply pressure actually required to be delivered to the feedpoint of the convey system. For example, in the first prior art system described above, the supply pressure produced by the blower remains critical at all times to insure the flow across the control valve is predictable by the above critical flow equation. As such, it is common for a ratio of the supply pressure, P1, to the convey pressure, P2, to be 1.6:1-2:1. This results in the power required to drive the air control system being 1.6×-2× greater than the energy required to move the material. Additionally, energy is lost to controlling the air control system accurately. In systems where the unused air is vented to atmosphere, a varying volume of air is unnecessarily compressed, thus creating further inefficiency. In the second prior art system described above, the unnecessary throttling of the blower inlet also produces inefficiency in energy consumption.

Employing a critical air flow regime is relatively computationally and structurally simple; it is simpler to vent or otherwise reduce an excess air supply pressure to the feedpoint than monitor and responsively control the air supply pressure across the control valve. Moreover, because P1 is held constant and because it is critical, the rate of air flow exiting the control valve is independent of P2, i.e., the air flow to the convey system is a function of valve position only. If the air control system relies on a constant air supply pressure to the control valve, then the above critical air flow equations allow for a relatively simple computation of the convey pressure, P2, needed for the convey system. Prior art air control systems thus essentially overcompensate for the air supply pressure required to operate the convey system properly with the negative consequence of increased energy consumption.

Accordingly, there is a need for an improved air control system for a CDP convey system. In particular, there is a need for an air control system that is more efficient, less costly, and that does not rely on critical air flow to achieve the desired amount of conveying air to the convey system.

SUMMARY

Embodiments of the present invention provide an improved air control system for a CDP convey system that addresses the above inefficiencies by eliminating the unnecessary venting of air to control the delivered air supply pressure to the feedpoint and by operating the control valve and the blower in a non-critical air flow regime. The convey system has an inlet for introduction of pressurized air into the system and an airlock associated with a feedpoint for introduction of particulate into the system. The pressurized air flows through the convey system from an upstream position and to a downstream position.

Embodiments of the convey system of the present invention comprise an air source for supplying pressurized air into the convey system, wherein the air source is positioned upstream of the inlet; a control valve positioned downstream of the air source and upstream of the inlet, wherein the control valve is operable to selectively adjust the rate of air flow received from the air source; a first pressure transducer for sensing a supply pressure, P1, produced by the air source, wherein the first pressure transducer is positioned downstream of the air source and upstream of the control valve; a second pressure transducer for sensing a convey pressure, P2, wherein the second pressure transducer is positioned downstream of the inlet and proximate the airlock; a convey line for receipt and conveying of said particulate therethrough; and a controller operable to receive first and second signals respectively corresponding to the sensed air pressures for the first and second pressure transducers, wherein the controller is operable to selectively control the air source to produce the supply pressure P1 and to control the positioning of the control valve.

The present invention provides an air control system that operates in the non-critical air flow regime. In particular, the value of the supply pressure P1 is only incrementally larger than the convey pressure P2. In embodiments of the present invention, a ratio of the supply pressure P1 to the convey pressure P2 is less than 1.2:1, less than 1.1:1, or less than 1.05:1.

BRIEF DESCRIPTION OF THE DRAWING FIGURES

Embodiments of the present invention are described in detail below with reference to the attached drawing figures, wherein.

The drawing figures do not limit the present invention to the specific embodiments disclosed and described herein. The drawings are not necessarily to scale, emphasis instead being placed upon clearly illustrating the principles of the invention.

DETAILED DESCRIPTION

The following detailed description references the accompanying drawings that illustrate specific embodiments in which the invention can be practiced. The embodiments are intended to describe aspects of the invention in sufficient detail to enable those skilled in the art to practice the invention. Other embodiments can be utilized and changes can be made without departing from the scope of the present invention. The following detailed description is, therefore, not to be taken in a limiting sense. The scope of the present invention is defined only by the appended claims, along with the full scope of equivalents to which such claims are entitled.

In this description, references to "one embodiment," "an embodiment," or "embodiments" mean that the feature or features being referred to are included in at least one embodiment of the technology. Separate references to "one embodiment," "an embodiment," or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments, but is not necessarily included. Thus, the present technology can include a variety of combinations and/or integrations of the embodiments described herein.

Embodiments of the present invention comprise a low pressure continuous dense phase convey system 10 having a convey line 12, an inlet 14 to the convey line 12 for introduction of pressurized air into the system, an airlock 16 associated with a feedpoint 18 of the convey line 12 for introduction of particulate into the system, and a non-critical air control system 20 for controlling a rate of air flow through the convey system 10. Pressurized air flows through the convey line 12 from an upstream position 22 and to a downstream position 24. The pressurized air moving through the convey line 12 serves to move particulate through the convey system 10. A rate of air flow through the convey line 12, commonly measured in cubic feet per second ($ft^3$/sec), dictates a volume of particulate moved through the system 10 and a distance the particulate can be moved. Common particulates include pet food, grain, sugar, flour, and the like.

Figure 1:
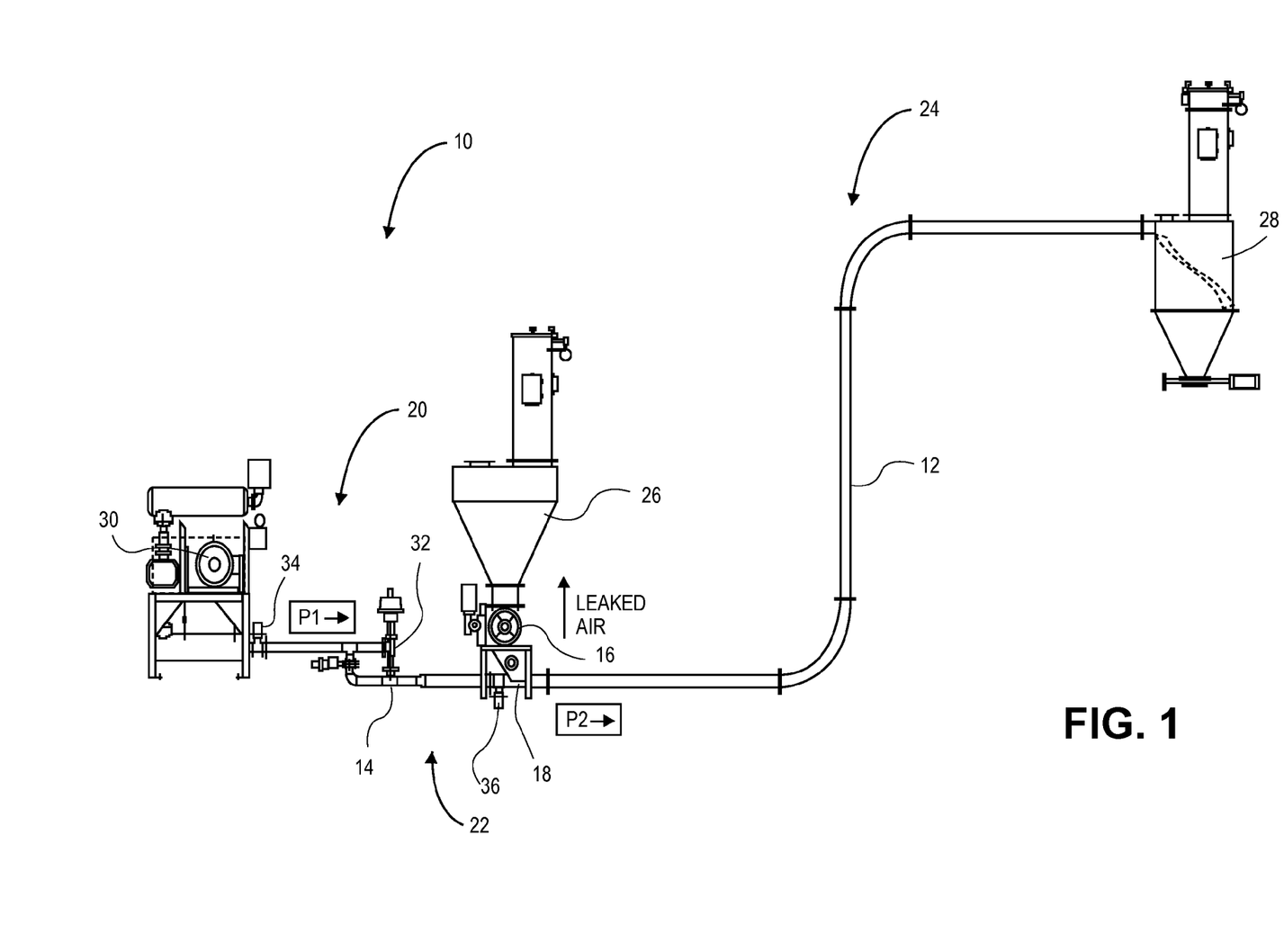
FIG. 1 is a diagram of a convey system, particularly illustrating a location of a supply pressure P1, a convey pressure P2, a control valve, and an airlock.

Referring to FIG. 1, the particulate is initially held in a hopper 26, as is known in the art. The particulate is fed or otherwise metered to the convey line 12 via the airlock 16. As noted above, during metering of the particulate to the convey line 12, some pressurized air leaks from the convey line 12, resulting in a decrease in the air flow rate proximate the airlock 16. After the particulate is fed through the convey line 12, the particulate exits to a collector 28 at the end of the convey line 12. A distance of the convey line 12 depends on the particular convey system 10 employed, but convey lines often can be several hundred to thousands of feet in length.

The air control system 20 of embodiments of the present invention comprises an air source 30 for supplying pressurized air into the convey system 10; a control valve 32 operable to selectively adjust the rate of flow of air received from the air source 30 to produce a non-critical air flow; a first pressure transducer 34 for sensing a supply pressure, P1, produced by the air source 30; a second pressure transducer 36 for sensing a convey pressure, P2, proximate the airlock 16; and a controller 38 operable to receive first and second signals respectively corresponding to the sensed air pressures for the first and second pressure transducers 34,36, and based on a non-critical flow equation, control output of the air source 30 to obtain a desired supply pressure P1, and positioning of the control valve 32 to obtain a desired air flow rate immediately downstream of the control valve 32.

Figure 2:
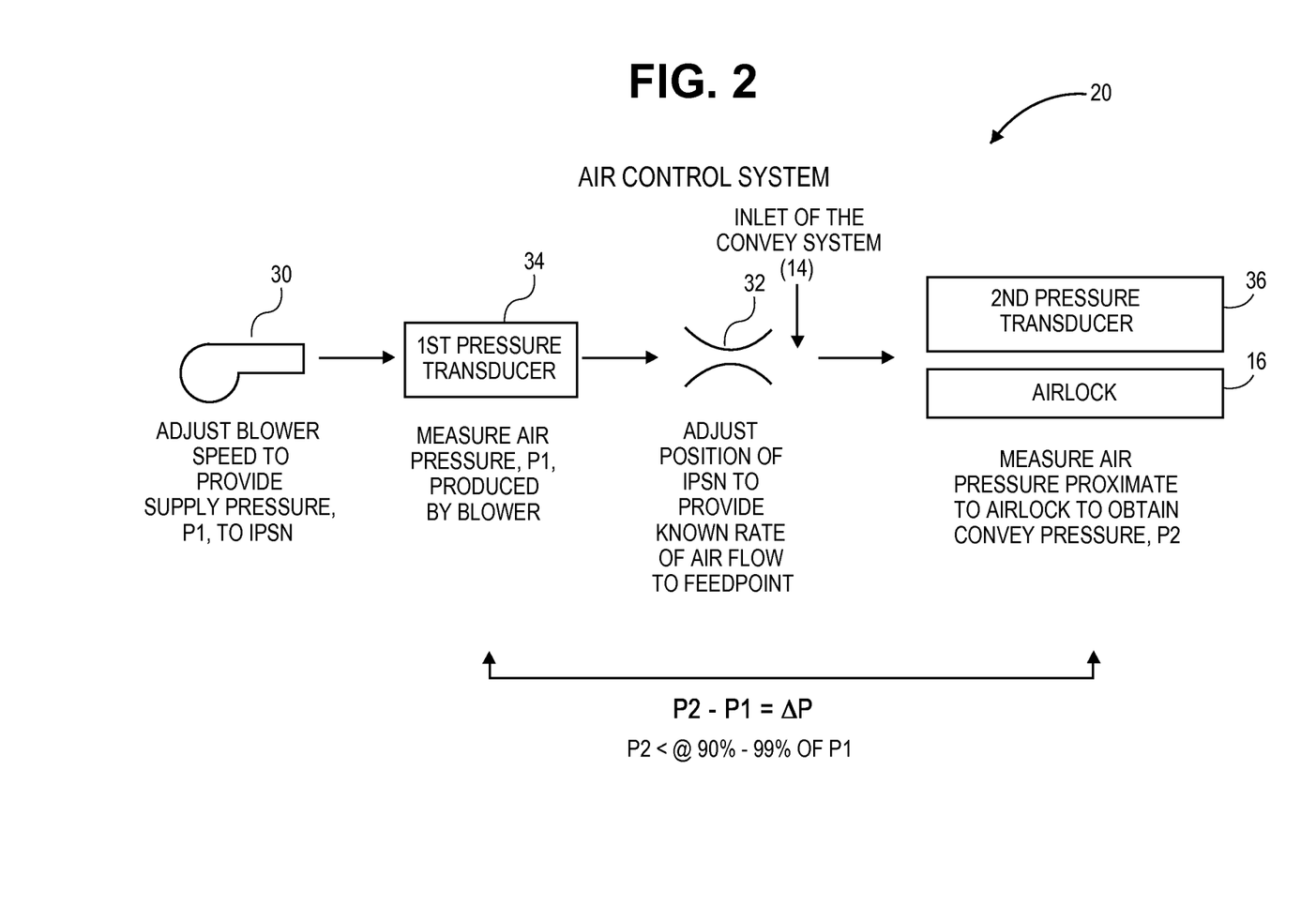
FIG. 2 is a schematic of an air control system of embodiments of the present invention.

Referring to FIGS. 1 and 2, the air source 30 is any source of pressurized air. For the convey system 10 of embodiments of the present invention, the air pressure used to convey particulate is relatively low, usually approximately 10-20 psi. The velocity of the particulates through the convey system 10 is also relatively low, usually approximately 400-1800 feet per minute ("FPM"). For the low convey pressures of embodiments of the present invention, the air source 30 is preferably a positive displacement blower controlled through a variable frequency drive ("VFD"). Blowers equipped with a VFD are well known, and in embodiments of the present invention, the speed of the blower may be adjusted to provide a known supply pressure P1 to the control valve 32.

Figure 3:
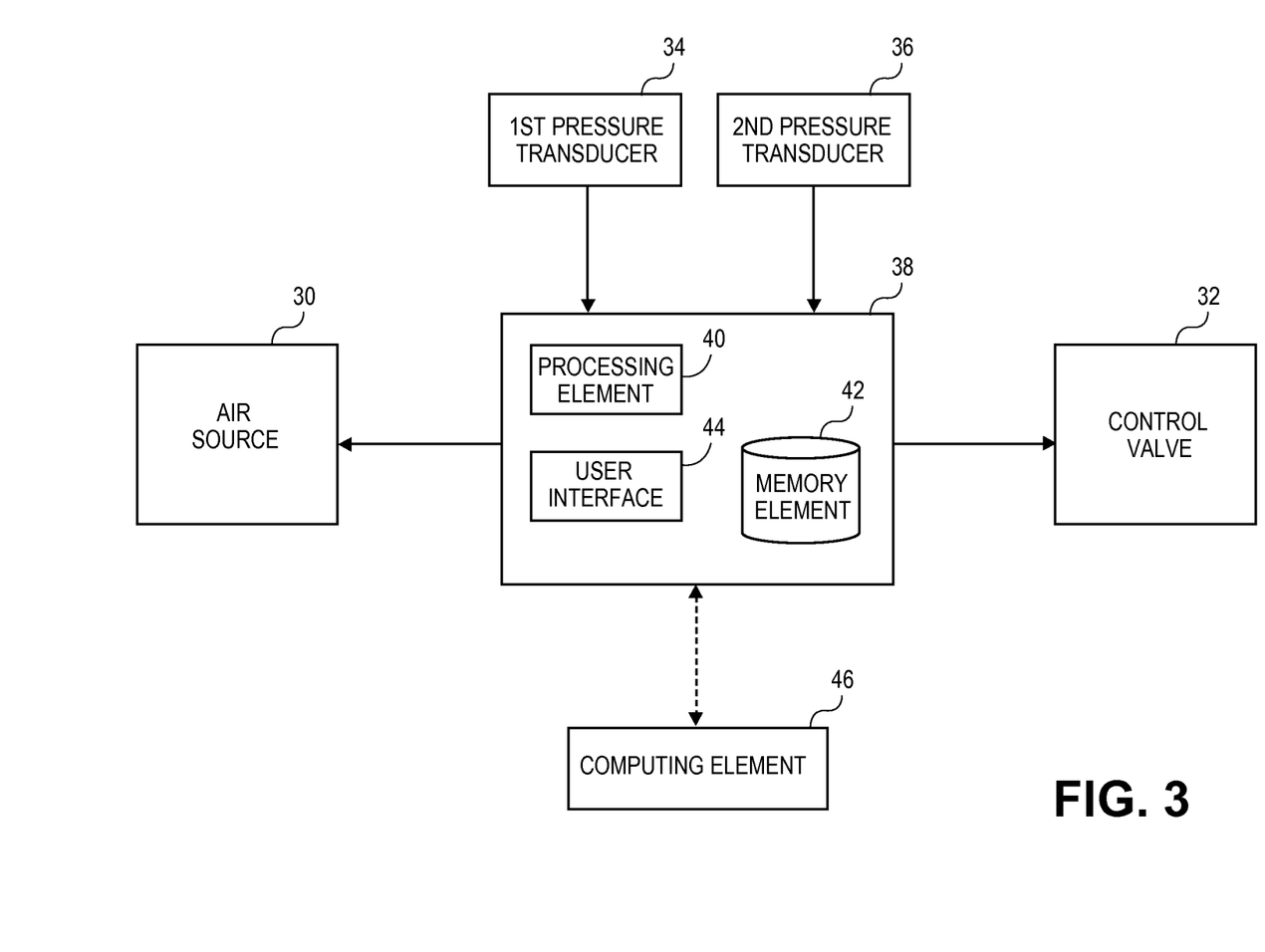
FIG. 3 is schematic of a controller of the air control system of embodiments of the present invention.

The air source 30 is positioned upstream of the inlet 14 of the convey system 10. Further, the air source 30 is electronically coupled with the controller 38 for electronic adjustment of the air source speed, as illustrated in FIG. 3. However, the air source 30 speed may be adjusted mechanically. It should be appreciated that other types of pressurized air sources, other than blowers, may be used.

The control valve 32 of the air control system 20 is operable to meter the air flow through the valve 32 to effect a desired air flow rate exiting the valve 32. In embodiments of the present invention, the control valve 32 is an infinite position sonic nozzle ("IPSN"), such as the MACTURI™ manufactured by MAC Equipment, Inc. of Kansas City, Mo., which is the assignee of the present invention. The control valve 32 is preferably electronically coupled with the controller 38 for adjusting the position of the control valve 32 based on a desired rate of air flow, as illustrated in FIG. 3. As used herein, the "position" of the control valve 32 refers to a physical change in the control valve's metering mechanism to effect the desired rate of air flow. Most control valves characterize the position of the valve as the percentage that the valve is "open" or "closed," such as, for example, a valve that is 40% open. Control valves other than ISPNs may be used, although ISPNs are known to be an efficient metering valve.

As best illustrated in FIGS. 1 and 2, the control valve 32 is positioned generally immediately downstream of the air source 30 and immediately upstream of the inlet 14 of the convey system 10. In embodiments of the present invention, the control valve 32 is preferably directly coupled to the inlet 14 of the convey system 10, such that the metered air exiting the control valve 32 is supplied to the convey line 12.

Referring to FIGS. 2 and 3, the first and second pressure transducers 34,36 are substantially similar and comprise any suitable pressure transducer for sensing a pressure at a particular location in the convey system 10. The transducers 34,36 are electronically coupled with the controller 38. Each transducer 34,36 senses the pressure at the particular location, and a signal comprising the sensed pressure is relayed to the controller 38. As described below, the controller 38 then uses the sensed pressure signals to control the air pressure produced by the air source 30 and the metering of the air flow through the control valve 32. Suitable pressure transducers 34,36 are manufactured by Setra Systems, Inc. of Boxborough, Mass.

As illustrated in FIGS. 1 and 2, the first pressure transducer 34 is positioned downstream of the air source 30 and upstream of the control valve 32 and inlet 14 so as to sense the supply pressure P1 being produced by the air source 30. The second pressure transducer 36 is positioned downstream of the inlet 14 and proximate the airlock 16 (either on the airlock transition or immediately upstream) so as to sense the convey pressure P2. As is known in the art, there is some air leakage from the convey system 10 proximate the airlock 16. Therefore, the second pressure transducer 36 is preferably positioned at a location proximate the airlock 16 so as to determine the air pressure in the convey system 10 after the air leakage at the airlock 16.

Referring to FIG. 3, the controller 38 of the air control system 20 is a programmable logic controller that includes a processing element 40 and a memory element 42. The controller 38 may also include a user interface 44 for access by a user of the invention and for control, input, or communication with the processing and memory elements 40,42 of the controller 38 and the various external components. In an exemplary embodiment, the controller 38 is an Allen-Bradley SLC 500. Some of the functions that the controller 38 handles include receiving a first signal from the first pressure transducer 34 representing a first sensed pressure and receiving a second signal from the second pressure transducer 36 representing a second sensed pressure. Upon receiving the first and second pressure signals, the controller 38 is operable to process the pressure signals and determine a desired control valve 32 position using the non-critical flow equations discussed in more detail below. The controller 38 then sends a control signal to the control valve 32 to instruct positioning of the valve. In even further embodiments of the invention, the controller 38 is coupled with and operable to control the speed of the air source 30 so as to emit a known supply pressure P1.

The processing element 40 may execute computer programs, software, code, instructions, algorithms, applications, or firmware, and combinations thereof. The processing element 40 may include processors, microprocessors, microcontrollers, field-programmable gate arrays (FPGAs), application-specific integrated circuits (ASICs), combinations thereof, and the like, and may be implemented using hardware description languages (HDLs), such as Verilog and VHDL.

The memory element 42 generally stores data to be utilized by the air control system 20. The data may include computer code, programs, applications, system settings, system preferences, measured data, combinations thereof, and the like. The memory element 42 may be configured to communicate with the processing element 40. The memory element 42 of the controller 38 includes data storage components, which may comprise a non-transitory computer-readable storage medium (or "computer-readable medium") capable of storing the computer programs, software, code, instructions, algorithms, applications, or firmware for use by or in connection with the processing element 40. The computer-readable medium may include random-access memory (RAM) such as static RAM (SRAM) or dynamic RAM (DRAM), cache memory, read-only memory (ROM), flash memory, hard-disk drives, compact disc ROM (CDROM), digital video disc (DVD), or Blu-Ray™, combinations thereof, and the like.

The controller 38 may include one or more device ports (not shown) for providing communication between the processing element 40 and the air source 30, the first and second pressure transducers 34,36, the control valve 32, and any other external component. The device port may include parallel ports, serial ports, USB ports, IEEE 1394 high-speed serial bus ports, combinations thereof, and the like. The device port may connect to the external components through a wire or cable, optical fiber, or wirelessly. An exemplary device port may include a plurality of USB ports.

The processing element 40 may also transmit signals through the device port to the external components in order to control the functions of the components or turn the components on or off. For example and as noted above, the processing element may receive the first and second pressure signals from the first and second pressure transducers 34,36, and based on the calculations performed by the controller, transmit a control signal to the control valve 32 for positioning of the valve or a control signal to the air source 30 for effecting a different air pressure. The processing element 40 may transmit signals to the external components either automatically, at a given time, or when a certain condition is met.

In embodiments of the present invention, the controller 38 may further be connected with an external computing element 46 for downloading flow performance characteristics or other convey system information for use and analysis by the user of the invention or for receiving program instructions or other information for storage on the controller's memory element 42.

Turning now to the computer program and method of the present invention, it is to be appreciated that certain steps of the method of the present invention are performed by the controller 38 executing a set of code segments stored on the computer-readable medium. Thus, certain steps of the method are performed by the controller 38, which includes the non-transitory computer-readable storage medium with an executable program stored thereon, wherein the program instructs the processing element 40 to perform certain steps.

In the computer program and method of the present invention, the controller 38 is employed to obtain a desired air flow rate. The desired air flow rate is based on a desired convey velocity, a length of the convey line 12, and the calculated air leakage through the airlock 16. The computer program stored on the memory element 42 of the controller 38 receives these inputs to calculate the desired air flow rate, or, alternatively, the desired input rate is input to the program. As discussed above, based on the sensed supply pressure P1 and the sensed convey pressure P2, the controller 38 then instructs the position of the valve 32 to obtain the calculated desired air flow rate. Embodiments of the present invention obtain a very high accuracy of the actual rate of air flow downstream of the control valve 32 versus the expected rate of air flow. Most prior art convey systems obtain no greater than approximately 10% accuracy, whereas the present invention obtains approximately 3% accuracy. Thus, the actual rate of air flow downstream of the control valve 32 is within 3% of the expected rate of air flow.

In embodiments of the present invention, a pressure differential across the control valve 32 is preferably maintained at a minimum specified value. Referring to FIG. 2, the pressure differential, ΔP, across the control valve 32 is the difference in the pressures P2 and P1. Because the first and second pressure transducers 34,36 are positioned on opposite flow sides of the control valve 32, the present invention is operable to determine the pressure differential. Unlike prior art air control systems that operate in a critical air flow state, such that the pressure differential is relatively large, embodiments of the present invention maintain a ratio of P1 to P2 as less than 1.5:1, less than 1.4:1, less than 1.3:1, less than 1.25:1, less than 1.2:1, less than 1.15:1, less than 1.1:1, or less than 1.05:1. Thus, the incremental value of the supply pressure P1 produced by the air source 30 over the actual convey pressure P2 at the airlock 16 is relatively small. In embodiments of the present invention that operate with a supply pressure P1 of approximately 8-25 psi, the differential pressure ΔP is 0.5-2.5 psi, 1-2 psi, or 1.2-1.8 psi. This results in an energy savings of approximately 30%-40% over prior art air control systems because the supply pressure P1 is only incrementally higher than the convey pressure P2, thus reducing energy use by the air source 30. However, because the differential pressure is reduced, the critical air flow equations are no longer valid.

To operate the air control system 20 at non-critical air flow values, embodiments of the present invention employ a control sequence that repeatedly monitors the supply pressure P1 and the convey pressure P2. In embodiments of the present invention, the first and second pressure transducers 34,36 perform approximately 2-10 scans per second, such that the controller 38 receives pressure signals from the transducers approximately every 0.1-0.5 seconds. The controller 38 then uses the received pressure values to repeatedly control, and if need be, change, the position of the control valve 32 to obtain the desired air flow rate. In even further embodiments of the present invention, the controller 38 changes the discharge pressure from the air source 30. However, unlike prior art systems where no control valve 32 is used and the air source 30 is instead throttled between providing little or no air pressure to very high air pressure, the air control system 20 of the present invention fluctuates the air pressure discharged by the air source 30 no more than ±0.2-3%, ±0.6-1.8%, or ±1% within any operating cycle (i.e., from the time the convey system 10 begins conveying particulate to the time it ceases conveying particulate) or from the previous control instruction or change of the air pressure. Unlike prior art systems where the supply pressure discharged from the air source 30 is held constant and a mechanical relief valve is used to vent the excess air, embodiments of the present invention do not hold the air source discharge constant.

Thus, based on the measured pressure values at any particular time, the air source pressure and the control valve position are set to obtain a desired air flow rate. Consequently, in a non-critical air flow system, the rate of air flow is a function of the supply pressure P1, the convey pressure P2, and the control valve position, as opposed to only being a function of the control valve position in a critical air flow system. By maintaining the pressure differential across the control valve 32 to a minimum specified value, the air flow through the valve 32 remains non-critical and the air source discharge pressure is minimized. Additional advantages beyond energy consumption include reduced noise from the air source 30, such as the blower, and reduced heat generation.

The following equation models the non-critical air flow rate, $Q_{nc}$, of the low pressure continuous dense phase system:

$$Q_{nc} = \frac{Q(\text{critical})}{x} * \left(\frac{P1 - P2}{P1}\right)^y \quad \text{Equation (1)}$$

where $Q_{nc}$=Non-Critical Rate of Air Flow in SCFM

Q(critical)=Critical Rate of Air Flow in SCFM

P1=Supply Pressure in PSIA

P2=Convey Pressure in PSIA x=Non-Critical Flow Constant y=Non-Critical Flow Constant As noted above, the control valve 32 may be any valve for metering the rate of air flow exiting the valve. Each type of valve 32, e.g., a butterfly valve versus an ISPN, will have a different critical flow model, Q(critical), which can be determined through testing or which is, more commonly, provided by the manufacturer of the valve. For non-critical air flow, however, Applicant has found Equation (1) to be a statistically correct model, regardless of the type of control valve employed. Nonetheless, when applying Equation (1) for non-critical flow, even for a particular type, brand, or model of control valve, each valve will have its own flow performance characteristics, namely the constants x and y in Equation (1). The flow performance characteristics for the particular valve must then be determined. To determine such characteristics, the rate of air flow at every control valve position and differential pressure across the valve in a statistical sample size must be measured.

For Applicant's MACTURI™ branded control nozzle, Q(critical) is best modeled with the following Equation (2):

$$Q(\text{critical}) = Cv * \frac{P1}{\rho_s * \sqrt{T}} \quad \text{Equation (2)}$$

Where Cv=MACTURI™ Flow Variable, which is then developed through testing as follows:

$$C_v = \frac{Q(\text{critical}) * \rho_s * \sqrt{T}}{P1} = K1 * \% \text{ Open} + K2 \quad \text{Equation (3)}$$

Where
K1=slope of $C_v$ versus % Open Curve
K2=intercept of $C_v$ versus % Open Curve.

Figure 4:
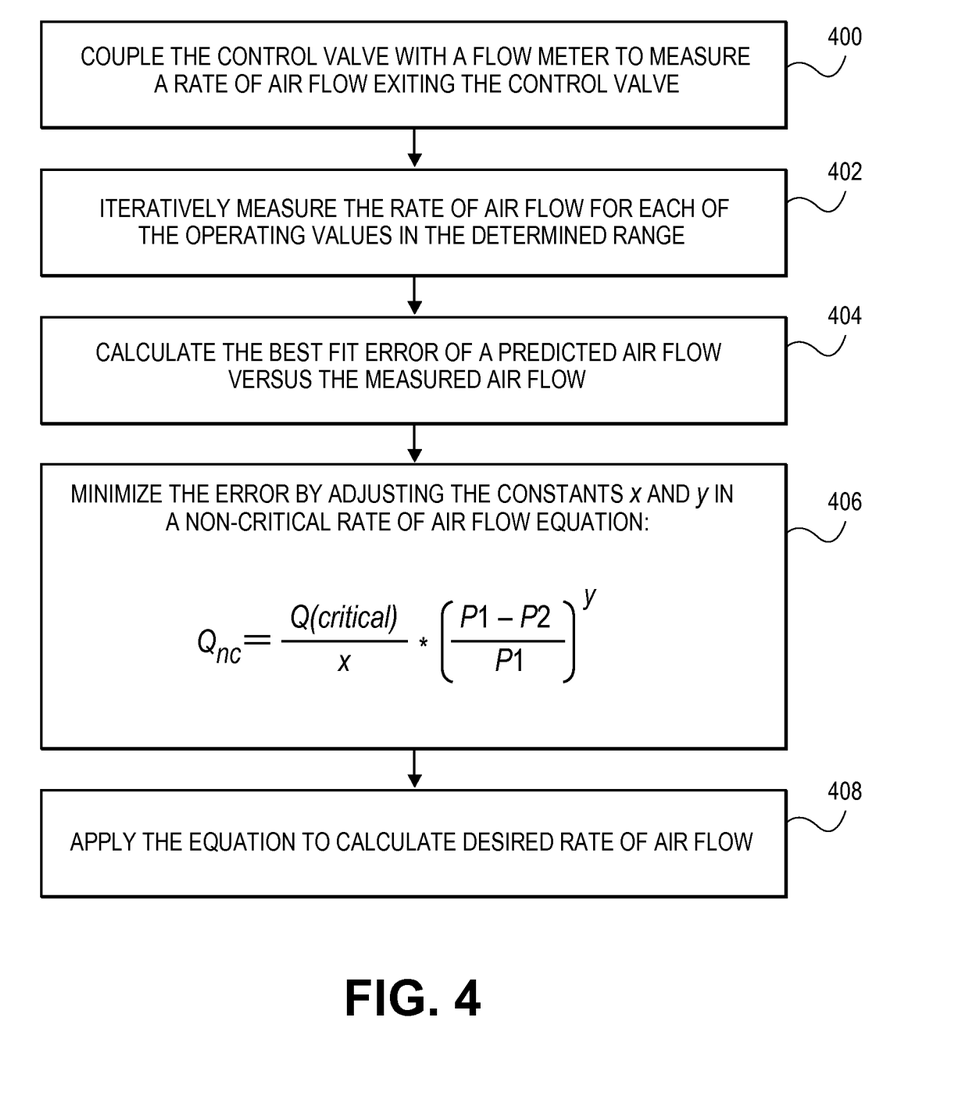
FIG. 4 is a flow chart of steps of determining a rate of air flow for the convey system of embodiments of the present invention.

In more detail, embodiments of the present invention provide a testing methodology for determining the non-critical flow performance characteristics, x and y, of a particular valve. Referring to FIG. 4 and Step 400, the control valve 32 is coupled with a flow meter to measure a rate of air flow exiting the valve 32. The rate of air flow from the valve 32 is measured for a variety of operating parameters, including supply pressure P1, convey pressure P2, and position. A range of values of each of supply pressure P1, convey pressure P2, and valve position is determined based on a type and volume of particulate being moved, the convey line length, and other variables. As referenced in Step 402, iterative testing for the range of values of each operating parameter is performed. Once the air flow rate for each range of values for each operating parameter is obtained, a best fit error through known statistical methods is obtained, as referenced in Step 404. The testing method thus determines an overall error of the predicted air flow versus the actual measured air flow. The error is then minimized by adjusting the constants x and y in Equation (1), as referenced at Step 406. Once the best fit values for constants x and y are known, the air flow for a given P1, P2, and valve position can be calculated using Equation (1), as referenced in Step 408. Equation (1) incorporates the critical flow equation for the particular valve, and the critical flow equation is a function of, at the least, valve position.

As noted above, using Equation (1) Applicant has obtained less than an approximately 3% error between the calculated rate of air flow and the actual rate of air flow. The method and computer program of the present invention can also input a desired air flow and known P1 and P2, and then apply Equation (1) to determine the necessary valve position to achieve the desired air flow.

Applicant performed testing using its MACTURI™ II branded IPSN, with the testing results provided below:

TABLE 1

| MACTURI ™ Model | II |
|---|---|
| # of Points | 96 |
| Minimum P1, PSIG | 3.0 |
| Maximum P1, PSIG | 13.0 |
| Minimum Stroke, % | 40 |
| Maximum Stroke, % | 70 |
| Minimum P2/P1 | 0.825 |
| Maximum P2/P1 | 0.945 |
| Average Error (Using Equation (1)) | 1.74 |
| Average Error (Using Critical Flow Equation) | 4.85 |
| x | 0.70 |
| y | 0.17 |

The above Equation (1) improves the prediction of non-critical air flow significantly over known critical flow equations. For the above-listed data set provided in Table 1 and tested by Applicant using its MACTURI™ II branded IPSN, the critical flow equation had an average absolute error of 4.85%, while the non-critical flow equation had an average absolute error of 1.74%. Additionally, the ratio of P2 to P1 exceeded 90%, which is well above the results achieved using critical air flow equations and a highly efficient control valve. Embodiments of the present invention, regardless of the control valve employed, routinely achieve a ratio of P2 to P1 of greater than or equal to 90%, greater than or equal to 93%, or greater than or equal to 95%. Alternatively stated, P2 is greater than or equal to 90% of P1, such that the differential pressure ΔP is less than 10% of P1.

For Applicant's other models of MACTURI™ branded control valves, the following Table 2 sets forth the test results. Particularly relevant is the ratio of P2 to P1, wherein for some of the control valves, P2 was only 4-7% lower than P1 (see, e.g., MACTURI™ I).

TABLE 2

| | | | Non-Critical Flow Data | | | | | |
|---|---|---|---|---|---|---|---|---|
| MACTURI ™ Model | Avg P1 PSIG | Stroke % | P2/P1 Min | P2/P1 Max | # of Points | Average Error, % | x | y |
| III-H (Original) | 80.1 | 10 | 0.909 | 0.920 | 2 | 0.16 | 0.83 | 0.09 |
| III-H (Original) | 82.2 | 40 | 0.886 | 0.920 | 4 | 0.36 | 0.81 | 0.12 |
| III-H | 29.9 | 0 | 0.872 | 0.925 | 5 | 0.43 | 0.70 | 0.20 |
| III-H | 30.2 | 25 | 0.853 | 0.922 | 6 | 0.52 | 0.84 | 0.19 |
| III-H | 29.9 | 50 | 0.835 | 0.946 | 7 | 0.97 | 0.83 | 0.18 |
| III-H | 29.9 | 100 | 0.888 | 0.940 | 5 | 0.35 | 0.79 | 0.16 |
| III-H | 80.3 | 100 | 0.886 | 0.924 | 4 | 0.54 | 0.85 | 0.13 |
| III-L | 30.1 | 25 | 0.901 | 0.945 | 4 | 0.37 | 0.68 | 0.19 |
| III-L | 29.7 | 50 | 0.904 | 0.955 | 6 | 0.79 | 0.72 | 0.18 |
| III-L | 30.4 | 100 | 0.903 | 0.937 | 4 | 0.45 | 0.76 | 0.16 |
| III-L | 79.6 | 100 | 0.896 | 0.914 | 3 | 0.18 | 0.83 | 0.12 |
| I (Original) | 55.0 | 70 | 0.951 | 0.963 | 2 | 0.61 | 0.62 | 0.18 |
| I (Original) | 80.0 | 70 | 0.913 | 0.963 | 4 | 0.33 | 0.70 | 0.16 |

As briefly discussed above, there are several advantages of the present invention. First, if the air source discharge pressure is minimized, then the air source 30 does not need to do as much work, which reduces energy consumption, heat generation, and noise from the air source 30. Additionally, a certain convey line 12 size can operate at a higher downstream pressure, whereby conveying more particulate a longer distance. In more detail, the air source 30 has a maximum air pressure value at which it can operate. Thus, max P1 is fixed. If operating in a critical air flow control system, then there is a maximum P2 value that is dependent on the max P1 value. In contrast, if operating in a non-critical air flow control system, then P1 does not reach its maximum as quickly, which allows for more particulate throughput relative to P2. If P2 can be increased relatively larger, then either more particulate can be added to and moved through the convey system 10, or the same amount of particulate can be conveyed a longer distance.

Although the invention has been described